(12) United States Patent
Yabe et al.

(10) Patent No.: US 11,311,819 B2
(45) Date of Patent: Apr. 26, 2022

(54) ION EXCHANGER

(71) Applicant: TOYOTA BOSHOKU KABUSHIKI KAISHA, Aichi-ken (JP)

(72) Inventors: Shingo Yabe, Obu (JP); Tomohiro Yoshida, Konan (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 36 days.

(21) Appl. No.: 16/700,143

(22) Filed: Dec. 2, 2019

(65) Prior Publication Data

US 2020/0188813 A1 Jun. 18, 2020

(30) Foreign Application Priority Data

Dec. 12, 2018 (JP) .............................. JP2018-232247

(51) Int. Cl.
  *B01D 15/22* (2006.01)
  *B01D 15/36* (2006.01)
  *G01N 30/60* (2006.01)
  *G01N 30/96* (2006.01)
  *H01M 8/04044* (2016.01)

(52) U.S. Cl.
  CPC .......... *B01D 15/22* (2013.01); *B01D 15/361* (2013.01); *G01N 30/60* (2013.01); *G01N 30/6091* (2013.01); *G01N 30/96* (2013.01); *H01M 8/04044* (2013.01)

(58) Field of Classification Search
  CPC ...... B01D 15/22; B01D 15/361; B01D 15/10; G01N 30/60; G01N 30/6091; G01N 30/96; G01N 30/6052; G01N 30/606; C02F 2201/006; C02F 2201/004;
  (Continued)

(56) References Cited

U.S. PATENT DOCUMENTS 6,193,689 B1 * 2/2001 Woodard ................ A61M 5/36
  604/122
7,214,311 B2 * 5/2007 Aberle .................. E03F 5/0404
  210/170.03
(Continued)

FOREIGN PATENT DOCUMENTS

JP    2017-159235       9/2017
KR    20140055670 A  *  5/2014

OTHER PUBLICATIONS

Search Report, European Patent Office, Application No. 19213422.9, dated Apr. 28, 2020.

*Primary Examiner* — Ryan B Huang
(74) *Attorney, Agent, or Firm* — Greenblum & Bernstein P.L.C.

(57) ABSTRACT

An ion exchanger includes a case and a cartridge. The case has an opening open upward. The cartridge is detachably attached to the case through the opening and includes a circumferential wall, a top wall, a lower opening, and a porous body. The cartridge accommodates an ion exchange resin. The porous body closes the lower opening of the cartridge and allows coolant to pass through while not allowing the ion exchange resin to pass through. A discharge hole that allows air inside the cartridge to be discharged out of the cartridge is formed in at least one of the top wall of the cartridge or a portion of the circumferential wall of the cartridge that is opposed to the inner circumferential surface of the case body.

10 Claims, 3 Drawing Sheets

(58) Field of Classification Search
CPC ......... C02F 2201/002; H01M 8/04044; H01M 8/04007; H01M 8/04
See application file for complete search history.

(56) References Cited

U.S. PATENT DOCUMENTS

| | | | |
|---|---|---|---|
| 7,396,473 B1* | 7/2008 | Guynn | B01D 35/185 |
| | | | 210/774 |
| 8,512,555 B1* | 8/2013 | Allen, II | B01D 24/08 |
| | | | 210/170.03 |
| 2009/0233134 A1 | 9/2009 | Hobmeyr et al. | |
| 2012/0148930 A1 | 6/2012 | Beylich et al. | |
| 2017/0263953 A1* | 9/2017 | Ohira | B01J 47/022 |

* cited by examiner

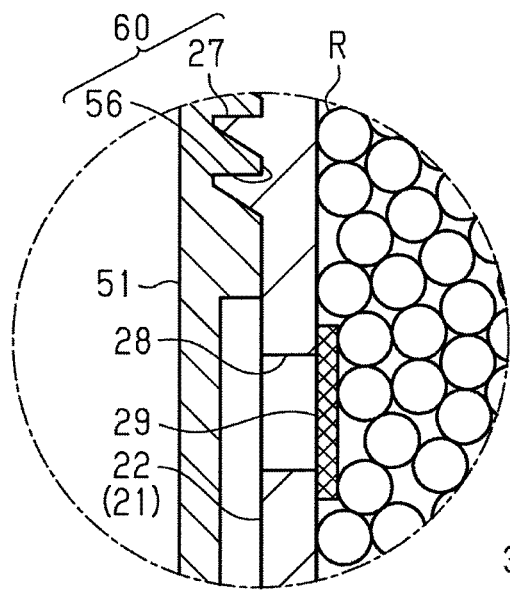
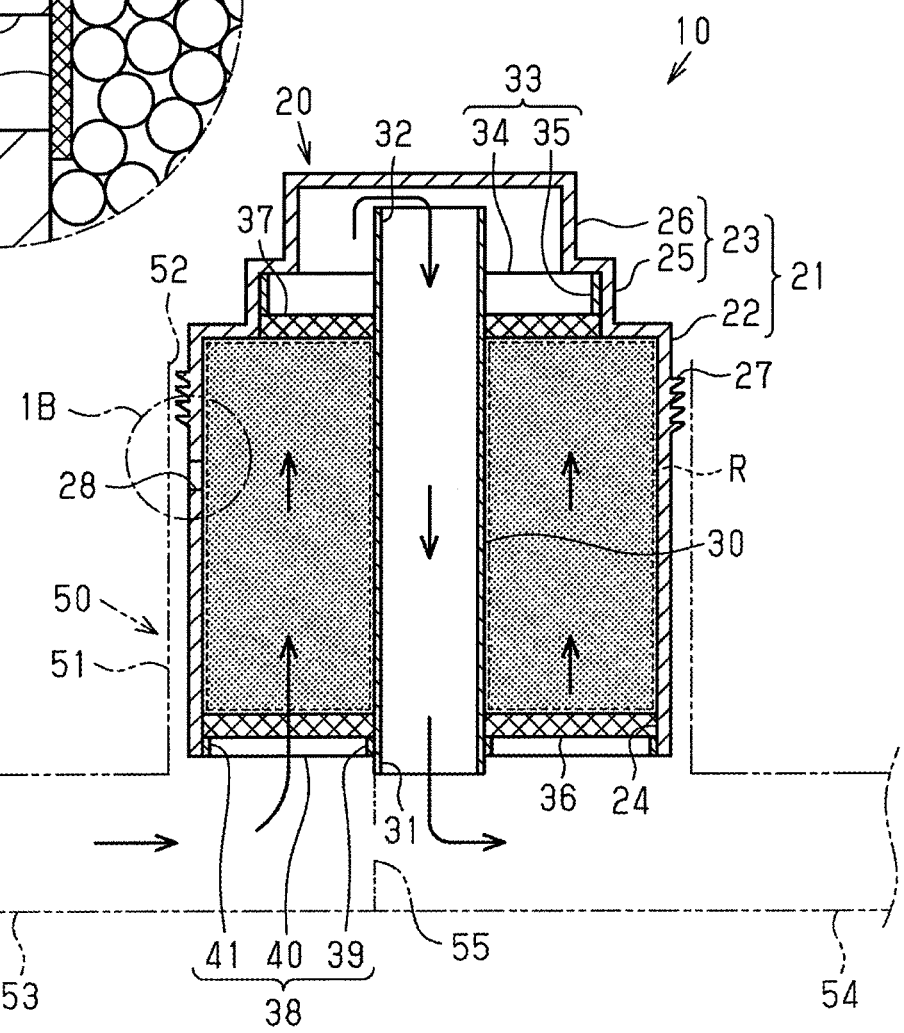

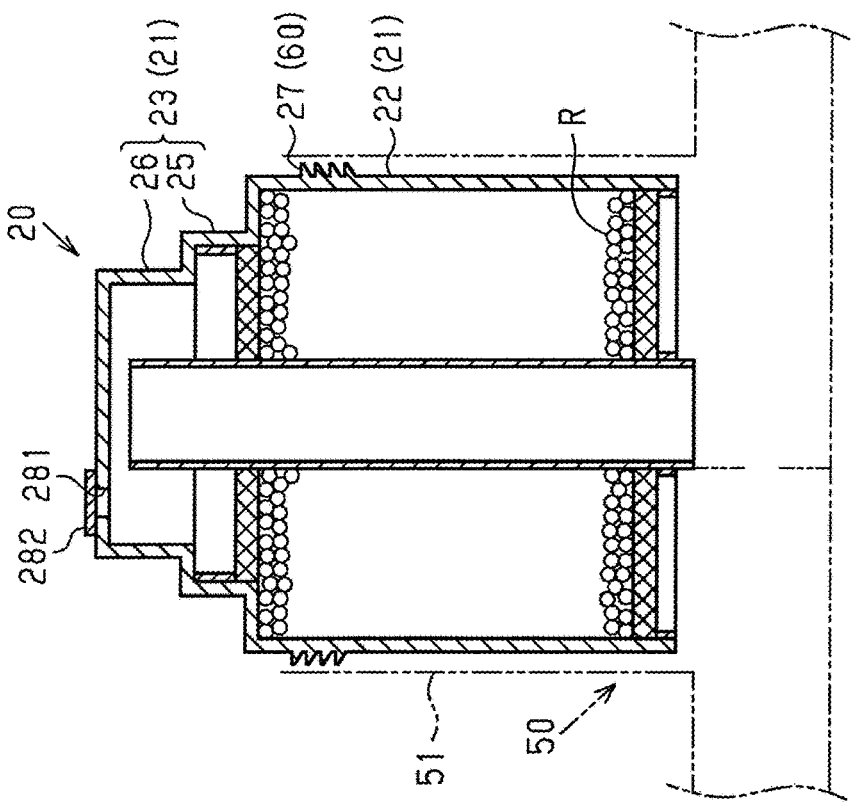
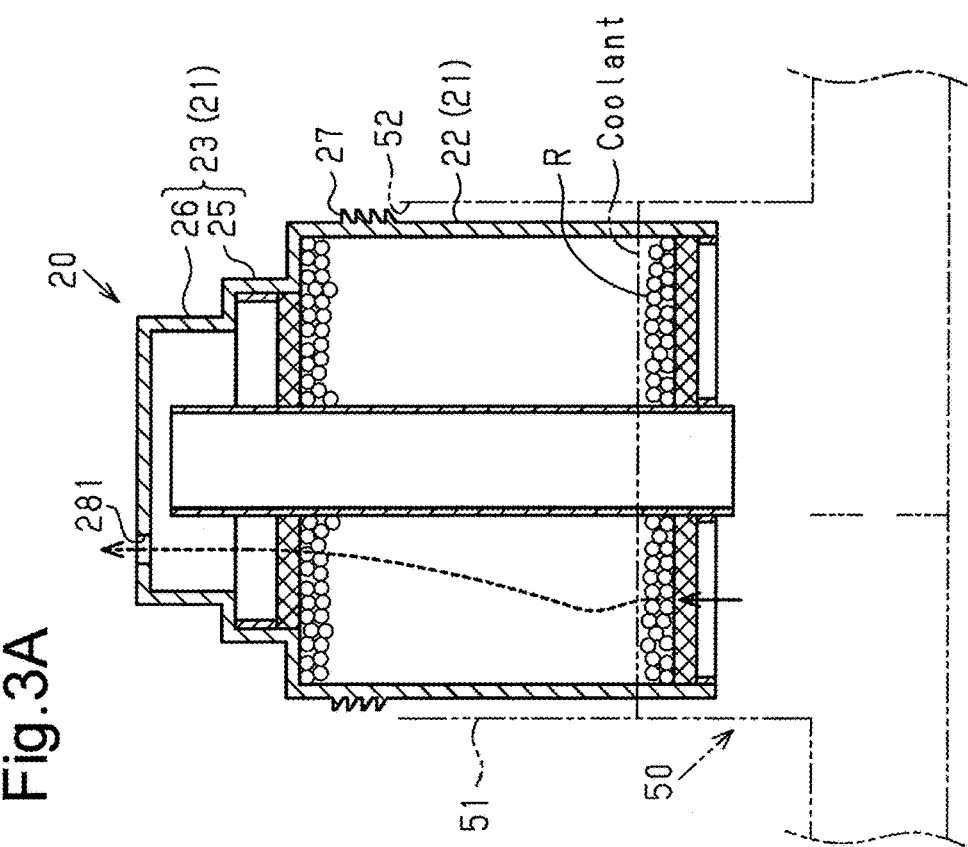

ION EXCHANGER

BACKGROUND

1. Field

The present disclosure relates to an ion exchanger.

2. Description of Related Art

A fuel cell includes a cooling circuit that circulates coolant for cooling a fuel cell stack in order to restrict rise in the temperature of the fuel cell stack at the time of power generation. The coolant may contain, for example, ethylene glycol as a major component. When the coolant is thermally decomposed in the fuel cell at the time of power generation, this will generate ions and raise the ionic concentration of the coolant so that the ions may lead to metal corrosion and decline in functionality of the fuel cell. In view of this, the cooling circuit includes an ion exchanger that adsorbs ions contained in coolant and removes ions from the coolant.

Japanese Laid-Open Patent Publication No. 2017-159235 describes an ion exchanger including a cylindrical case that has an opening open upward and a cap that closes the opening of the case. The case includes, at the lower portion, an inflow hole, through which coolant flows in, and an outflow hole, through which the coolant flows out. The cap has an open portion that opens downward, and the cap is detachably attached to the case. The cap accommodates a tube member that is open upward and downward. The cap and the tube member define a toroidal storage space that is filled with ion exchange resin. A part of the open portion of the cap that is connected to the storage space is closed by a mesh member. In such an ion exchanger, coolant flowing into the lower portion of the case through the inflow hole flows into the storage space through pores of the mesh member. When the coolant goes through the storage space, ions contained in the coolant are adsorbed by the ion exchange resin. The coolant that has gone through the storage space flows into the tube member from an upper opening of the tube member, is discharged out of the cap from the lower opening of the tube member, and flows out of the outflow hole formed in the lower portion of the case.

In the ion exchanger described in the above publication, the cap, the tube member, the ion exchange resin, and the mesh member form a cartridge detachable from the case.

Such an ion exchanger may cause inconvenience as described below when a cartridge filled with new ion exchange resin is attached to the case. Specifically, when the cartridge is detached from the case, coolant in the case has a liquid level. Accordingly, when the cartridge is pushed into the case, the liquid level of the coolant will rise so that the coolant may leak out of the opening of the case through a space between the inner circumferential surface of the case and the outer circumferential surface of the cap.

SUMMARY

It is an objective of the present disclosure to provide an ion exchanger that prevents coolant from leaking out of a case when a cartridge is replaced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, an ion exchanger that achieves the above object includes a case including a case body that has an opening open upward and further including, at a lower portion, an inflow portion, through which coolant flows into the case body, and an outflow portion, through which the coolant flows out of the case body and a cartridge detachably attached to the case through the opening, where the cartridge includes a circumferential wall, a top wall, a lower opening, and a porous body and accommodates an ion exchange resin, where the porous body closes the lower opening of the cartridge and allows the coolant to pass through while not allowing the ion exchange resin to pass through. A discharge hole that allows air inside the cartridge to be discharged out of the cartridge is formed in at least one of the top wall of the cartridge or a portion of the circumferential wall of the cartridge that is opposed to an inner circumferential surface of the case body.

Other features and aspects will be apparent from the following detailed description, the drawings, and the claims.

BRIEF DESCRIPTION OF THE DRAWINGS

FIG. 1A is a cross-sectional view of the structure of a cartridge in an ion exchanger according to one embodiment.

FIG. 1B is an enlarged cross-sectional view of section 1B of FIG. 1A.

FIG. 3A is a cross-sectional view corresponding to FIG. 1A, illustrating a state in which a cartridge of a variation is in the process of being attached to a case.

FIG. 3B is a cross-sectional view corresponding to FIG. 1A, illustrating a state in which the cartridge of FIG. 3A is attached to the case.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2A:
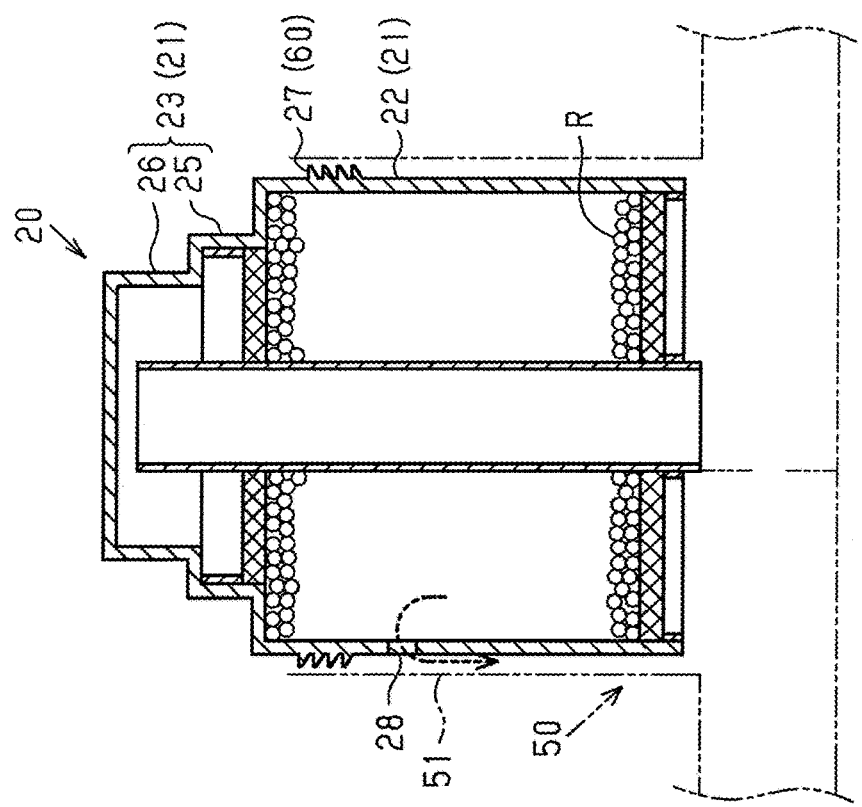
FIG. 2A is a cross-sectional view corresponding to FIG. 1A, illustrating a state in which a cartridge is in the process of being attached to a case.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An ion exchanger 10 according to one embodiment will now be described with reference to FIGS. 1A to 2B.

As shown in FIG. 1A, a cooling circuit of a fuel cell includes the ion exchanger 10 that removes ions from coolant.

The ion exchanger 10 includes a case 50 and a cartridge 20. The case 50 includes a substantially cylindrical case body 51 having a closed end, and the case body 51 has an opening 52 open upward. The cartridge 20 is detachably attached to the case 50 through the opening 52 and accommodates ion exchange resin R.

The case 50 includes, at the lower portion, an inflow portion 53, through which coolant flows into the case body 51, and an outflow portion 54, through which the coolant flows out of the case body 51. A throttle portion 55 connected to the inflow portion 53 and the outflow portion 54 is arranged between the inflow portion 53 and the outflow portion 54.

The cartridge 20 includes a substantially cylindrical cap 21 having a closed end, where the cap 21 has a lower opening 24, and a tubular member 30 that is coaxial with the cap 21 inside the cap 21.

The cap 21 includes a cylindrical circumferential wall 22 and a top wall 23. The top wall 23 includes a first reduced diameter portion 25 that is cylindrical and reduced in diameter from the circumferential wall 22 and a second reduced diameter portion 26 that is upwardly adjacent to the first reduced diameter portion 25 and further reduced in diameter than the first reduced diameter portion 25.

As shown in FIGS. 1A and 1B, an external thread 27 is provided on the upper portion of the outer circumferential surface of the circumferential wall 22. The external thread 27 is threaded into an internal thread 56 provided on the inner circumferential surface of the case body 51. The external thread 27 of the cap 21 is threaded into the internal thread 56 of the case body 51 so that the cartridge 20 is detachably attached to the case 50. The external thread 27 and the internal thread 56 form an annular sealing portion 60 that seals a portion between the inner circumferential surface of the case body 51 and the outer circumferential surface of the circumferential wall 22 of the cap 21 (cartridge 20).

The circumferential wall 22 of the cap 21 has a discharge hole 28 at a lower side of the external thread 27, more specifically, a portion that is opposed to the inner circumferential surface of the case body 51 when the cartridge 20 is attached to the case 50. The discharge hole 28 is closed at the radially inner side of the circumferential wall 22 by a porous member 29 having multiple pores that are smaller than the discharge hole 28.

The pores of the porous member 29 have sizes that allow coolant to pass through while not allowing the ion exchange resin R to pass through.

The tubular member 30 has, at the upper outer circumferential surface, a support portion 33 including projections 34 and an annular portion 35. The projections 34 project outward from the upper outer circumferential surface of the tubular member 30 and are spaced apart from each other in the circumferential direction. The annular portion 35 connects radially outer ends of the projections 34 together. The annular portion 35 is joined to the inner circumferential surface of the first reduced diameter portion 25 of the cap 21. The tubular member 30 is fixed to the cap 21. The upper end of the tubular member 30 is spaced downward from the top wall 23.

A first annular porous body 36 that has a central hole is attached by a gasket (not shown) in a space between the lower outer circumferential surface of the tubular member 30 and the inner circumferential surface of the lower opening 24 of the cap 21. The first porous body 36 allows coolant to pass through while not allowing the ion exchange resin R to pass through.

A second annular porous body 37 that has a central hole is attached by a gasket (not shown) in a space between the upper outer circumferential surface of the tubular member 30 and the inner circumferential surface of the first reduced diameter portion 25 of the cap 21. The second porous body 37 allows coolant to pass through while not allowing the ion exchange resin R to pass through. The second porous body 37 is vertically adjacent to the support portion 33.

A support member 38 is detachably attached to the lower opening 24 of the cap 21. The support member 38 includes an inner annular portion 39, projections 40, and an outer annular portion 41. The inner annular portion 39 is fitted onto the tubular member 30. The projections 40 project outward from the inner annular portion 39 and are spaced apart from each other in the circumferential direction. The outer annular portion 41 connects the radially outer ends of the projections 40 together.

In the cartridge 20, the circumferential wall 22 of the cap 21, the tubular member 30, the first porous body 36, and the second porous body 37 define a toroidal storage space in which the ion exchange resin R is accommodated.

In the ion exchanger 10, which has the above-described configuration, as shown by arrows in FIG. 1A, when coolant flowing in the cooling circuit flows into the case body 51 from the inflow portion 53, some of the coolant flows through the first porous body 36, the ion exchange resin R, and the second porous body 37 in this order and then flows into the tubular member 30 from an upper opening 32. The coolant that has flowed into the tubular member 30 flows downward inside the tubular member 30, is discharged out of the cartridge 20 from a lower opening 31, and flows out in the outflow portion 54. When the coolant passes through the ion exchange resin R, ions in the coolant are exchanged and removed.

An operation of the present embodiment will now be described.

As shown in FIG. 2A, when the cartridge 20 is attached to the case 50, coolant that is present inside the case body 51 tries to enter the cartridge 20 from the lower portion of the cartridge 20 as shown by a solid-line arrow in FIG. 2A. This raises the air pressure of the cartridge 20.

However, as shown by a broken-line arrow in FIG. 2A, air inside the cartridge 20 is discharged out of the cartridge 20 through the discharge hole 28 so that the coolant enters the cartridge 20. This restricts rise in the liquid level of the coolant inside the case body 51 in comparison with a case in which the discharge hole 28 is not formed (Operation 1).

Figure 2B:
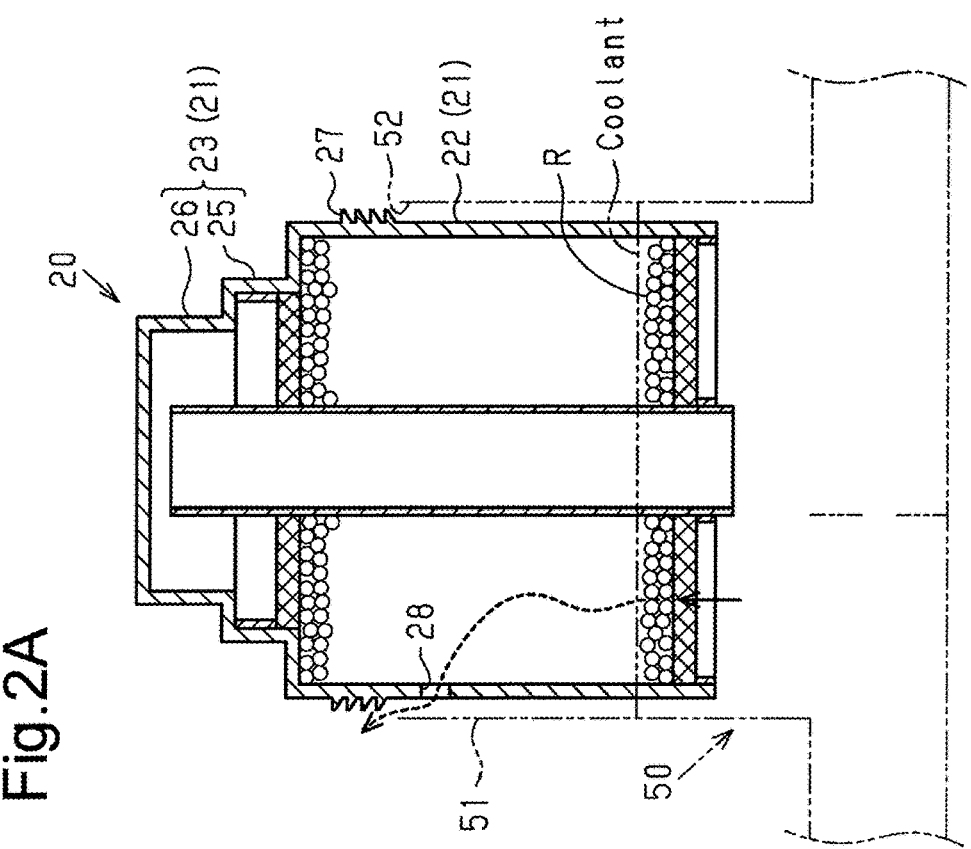
FIG. 2B is a cross-sectional view corresponding to FIG. 1A, illustrating a state in which the cartridge is attached to the case.

Further, as shown in FIG. 2B, the discharge hole 28 is formed at a lower side of the external thread 27 (sealing portion 60) in the circumferential wall 22 of the cartridge 20. Thus, when the cartridge 20 is attached to the case 50, coolant inside the cartridge 20 does not leak out of the case 50 through the discharge hole 28 (Operation 2).

The advantages of the present embodiment will now be described.

(1) The circumferential wall 22 of the cartridge 20 has the discharge hole 28 at the portion that is opposed to the inner circumferential surface of the case body 51. The discharge hole 28 allows air inside the cartridge 20 to be discharged out of the cartridge 20.

Operation 1 above provided by such a structure prevents coolant from leaking out of the case 50 when the cartridge 20 is replaced.

(2) The annular external thread 27 and the internal thread 56, which form the sealing portion 60, are arranged between the inner circumferential surface of the case body 51 and the outer circumferential surface of the circumferential wall 22 of the cartridge 20. The discharge hole 28 is formed at the lower side of the external thread 27 on the circumferential wall 22.

The discharge hole 28 formed at the upper end such as the top wall 23 of the cartridge 20 requires an additional member that closes the discharge hole 28 in order to prevent the ion exchange resin R and coolant from leaking out.

However, Operation 2 provided by the above structure eliminates the necessity of such a member that closes the discharge hole 28. This simplifies the structure of the ion exchanger 10.

(3) The discharge hole 28 is closed by the porous member 29 having multiple pores that are smaller than the discharge hole 28.

With such a structure, the discharge hole 28 is closed by the porous member 29 so that the ion exchange resin R is prevented from leaking out of the discharge hole 28 even if the size of the discharge hole 28 is not reduced. This simplifies the structure of the cap 21.

Modifications

The above-described embodiment may be modified as follows. The above-described embodiment and the following modifications can be combined as long as the combined modifications remain technically consistent with each other.

Plural discharge holes 28 may be formed.

The discharge hole 28 may be replaced with plural pores formed in the circumferential wall 22 of the cap 21. The pores serve as a discharge hole and have sizes that do not allow the ion exchange resin R to pass through. Such a structure eliminates the porous member 29.

The sealing portion 60 formed by the internal thread 56 of the case body 51 and the external thread 27 of the cap 21 may be replaced with a sealing member such as an O-ring that serves as a sealing portion. In this case, a discharge hole may preferably be located below the sealing portion in the circumferential wall 22 of the cap 21.

As shown in FIGS. 3A and 3B, the discharge hole 28 may be replaced with a discharge hole 281 that is formed in the top wall 23 of the cap 21 (cartridge 20). In this case, as shown in FIG. 3A, the discharge hole 281 may be open when the cartridge 20 is attached to the case 50. Further, as shown in FIG. 3B, after the cartridge 20 is attached, the discharge hole 281 may be closed by a cover 282 that is a separate member of the cap 21. Such a structure prevents coolant from leaking out of the case 50 when the cartridge 20 is replaced and also prevents coolant from leaking out of the discharge hole 281 when the cartridge 20 is attached to the case 50.

The circumferential wall 22 of the cartridge 20 may have a discharge hole at the portion that is opposed to the inner circumferential surface of the case body 51, and the top wall 23 of the cartridge 20 may have a discharge hole.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An ion exchanger comprising:
   a case including a case body that has an opening open upward and further including, at a lower portion, an inflow portion, through which coolant flows into the case body, and an outflow portion, through which the coolant flows out of the case body; and
   a cartridge detachably attached to the case through the opening, wherein the cartridge includes a circumferential wall, a top wall, a lower opening, and a porous body and accommodates an ion exchange resin, wherein
   the porous body closes a portion of the lower opening of the cartridge and allows the coolant to pass through the porous body while not allowing the ion exchange resin to pass through the porous body, and the coolant flows out of the cartridge to the outflow portion of the case by flowing out of another portion of the lower opening of the cartridge, and
   a discharge hole that allows air inside the cartridge to be discharged out of the cartridge is formed in a portion of the circumferential wall of the cartridge that is opposed to an inner circumferential surface of the case body.

2. The ion exchanger according to claim 1, wherein the discharge hole is closed by a porous structure having multiple pores that are each smaller than the discharge hole.

3. The ion exchanger according to claim 1, wherein the cartridge includes a tube that is coaxial with the cartridge, and the tube provides a flow path through which the coolant flows out of the cartridge.

4. The ion exchanger according to claim 3, wherein the porous body is disposed circumferentially around the tube.

5. The ion exchanger according to claim 3, wherein the porous body includes a hole, and the tube extends through the hole of the porous body.

6. The ion exchanger according to claim 5, wherein the cartridge includes a second porous body disposed at an upper part of the cartridge and that allows the coolant to pass through while not allowing the ion exchange resin to pass through.

7. The ion exchanger according to claim 6, wherein the second porous body includes a hole, and the tube extends through the hole of the second porous body.

8. The ion exchanger according to claim 1, wherein the inflow portion and the outflow portion of the case are disposed so that the coolant flows through the inflow portion and the outflow portion in a same first flow direction.

9. The ion exchanger according to claim 8, wherein the cartridge is disposed so that the coolant flows through the cartridge in a second flow direction that is perpendicular to the first flow direction.

10. An ion exchanger comprising:
    a case including a case body that has an opening open upward and further including, at a lower portion, an inflow portion, through which coolant flows into the case body, and an outflow portion, through which the coolant flows out of the case body; and
    a cartridge detachably attached to the case through the opening, wherein the cartridge includes a circumferential wall, a top wall, a lower opening, and a porous body and accommodates an ion exchange resin, wherein
    the porous body closes a portion of the lower opening of the cartridge and allows the coolant to pass through the porous body while not allowing the ion exchange resin to pass through the porous body, and the coolant flows out of the cartridge to the outflow portion of the case by flowing out of another portion of the lower opening of the cartridge, a discharge hole that allows air inside the cartridge to be discharged out of the cartridge is formed in at least one of the top wall of the cartridge or a portion of the circumferential wall of the cartridge that is opposed to an inner circumferential surface of the case body, an annular seal portion is arranged between the inner circumferential surface of the case body and an outer circumferential surface of the circumferential wall of the cartridge, the annular seal portion seals a portion between the inner circumferential surface of the case body and the outer circumferential surface of the circumferential wall of the cartridge, and the discharge hole is located below the seal portion in the circumferential wall.

* * * * *